US010318586B1

(12) United States Patent
Rose et al.

(10) Patent No.: US 10,318,586 B1
(45) Date of Patent: Jun. 11, 2019

(54) SYSTEMS AND METHODS FOR EDITING AND REPLAYING NATURAL LANGUAGE QUERIES

(71) Applicant: Google Inc., Mountain View, CA (US)

(72) Inventors: Robert Brett Rose, Boulder, CO (US); Gregory Brandon Owen, Westminster, CO (US); Keith Charles Bottner, Lafayette, CO (US)

(73) Assignee: Google LLC, Mountain View, CA (US)

( * ) Notice: Subject to any disclaimer, the term of this patent is extended or adjusted under 35 U.S.C. 154(b) by 503 days.

(21) Appl. No.: 14/463,189

(22) Filed: Aug. 19, 2014

(51) Int. Cl.
*G06F 16/9032* (2019.01)
*G06F 17/30* (2006.01)
*G06F 17/28* (2006.01)
*G06F 3/0482* (2013.01)
*G06F 16/28* (2019.01)

(52) U.S. Cl.
CPC ...... *G06F 16/90332* (2019.01); *G06F 3/0482* (2013.01); *G06F 16/285* (2019.01); *G06F 17/28* (2013.01); *G06F 17/30598* (2013.01); *G06F 17/30976* (2013.01)

(58) Field of Classification Search
CPC .................................................. G06F 17/30976
USPC ....................................................... 707/740
See application file for complete search history.

(56) References Cited

U.S. PATENT DOCUMENTS

| 5,937,168 | A | * | 8/1999 | Anderson | G06F 15/17 |
| 7,552,053 | B2 | * | 6/2009 | Gao | G06F 17/2827 |
| | | | | | 704/258 |
| 8,065,316 | B1 | | 11/2011 | Baker et al. | |
| 8,170,003 | B2 | * | 5/2012 | Sasaki | H04L 67/00 |
| | | | | | 370/352 |
| 8,869,049 | B1 | * | 10/2014 | Li | G06F 3/00 |
| | | | | | 715/705 |
| 9,196,242 | B1 | * | 11/2015 | Master | G10L 15/08 |
| 10,084,913 | B2 | * | 9/2018 | Montenegro | G06Q 30/016 |
| 2006/0294071 | A1 | * | 12/2006 | Weare | G06F 17/30864 |
| 2008/0270142 | A1 | * | 10/2008 | Srinivasan | G06F 17/30899 |
| | | | | | 704/270.1 |
| 2009/0070201 | A1 | * | 3/2009 | Hodges | G06Q 10/04 |
| | | | | | 705/34 |
| 2012/0016678 | A1 | * | 1/2012 | Gruber | G06F 17/3087 |
| | | | | | 704/275 |
| 2012/0239653 | A1 | | 9/2012 | Platt et al. | |
| 2013/0086026 | A1 | * | 4/2013 | Hebert | G06F 17/30646 |
| | | | | | 707/706 |
| 2014/0163978 | A1 | * | 6/2014 | Basye | G10L 15/28 |
| | | | | | 704/233 |

(Continued)

FOREIGN PATENT DOCUMENTS

WO    WO-2013170383 A1    11/2013

*Primary Examiner* — Cam Linh T Nguyen
(74) *Attorney, Agent, or Firm* — Lowenstein Sandler LLP

(57) ABSTRACT

Systems and methods are disclosed herein for processing a natural language query. A receiver circuitry receives the natural language query from a user. A natural language interpreter circuitry parses the natural language query to convert the natural language query into a plurality of categories and a plurality of variables, each variable in the plurality of variables corresponding to one category in the plurality of categories. A user interface displays to the user the plurality of categories and the plurality of variables, and allows the user to modify at least one variable in the plurality of variables by providing a natural language utterance.

17 Claims, 11 Drawing Sheets

(56) References Cited

U.S. PATENT DOCUMENTS

| | | | | |
|---|---|---|---|---|
| 2014/0236986 A1* | 8/2014 | Guzman | ........... | G06F 17/30011 |
| | | | | 707/769 |
| 2015/0186551 A1* | 7/2015 | Badimon | .......... | G06F 17/30976 |
| | | | | 707/722 |
| 2016/0140228 A1* | 5/2016 | Cohen | ............... | G06F 17/30864 |
| | | | | 707/708 |

* cited by examiner

840 — "SHOW ME THE DOCUMENT THAT I OPENED AT THE RESTAURANT LAST NIGHT."

106 —
YOU OPENED THESE DOCUMENTS WHEN YOU WERE AT RESTAURANT A BETWEEN 7 AND 9 PM LAST NIGHT:

DOCUMENT 1
DOCUMENT 2
DOCUMENT 3

841 — "NO THE PLACE AFTER RESTAURANT A."

106 —
YOU OPENED THESE DOCUMENTS WHEN YOU WERE AT BAR B BETWEEN 9 AND 11 PM LAST NIGHT:

DOCUMENT 4
DOCUMENT 5

FIG. 8

942 — "MAKE A FOLDER AND PUT ALL THE DOCUMENTS IN THE CHICAGO TRIP LAST WEEK IN THE FOLDER. CALL IT LAST WEEK'S TRIP."

106 — THREE DOCUMENTS HAVE BEEN STORED IN THE NEW FOLDER "LAST WEEK'S TRIP":

LAST WEEK'S TRIP
    DOCUMENT A
    DOCUMENT B
    DOCUMENT C

943 — "ACTUALLY, LET'S CALL IT CHICAGO INSTEAD."

106 — THE NEW FOLDER "LAST WEEK'S TRIP" HAS BEEN RENAMED TO "CHICAGO" AND INCLUDES THE THREE DOCUMENTS:

CHICAGO
    DOCUMENT A
    DOCUMENT B
    DOCUMENT C

FIG. 9

1044 — "SHOW ME MOVIES PLAYING TONIGHT IN BOULDER."

106 — THESE MOVIES ARE PLAYING IN BOULDER TONIGHT:
  MOVIE 1 AT 7 PM, 9 PM
  MOVIE 2 AT 7:30 PM, 10 PM
  MOVIE 3 AT 8 PM

1046 — "ACTUALLY, LET'S TRY LYONS"

106 — THESE MOVIES ARE PLAYING IN LYONS TONIGHT:
  MOVIE 1 AT 7 PM, 9 PM
  MOVIE 2 AT 7:30 PM, 10 PM
  MOVIE 3 AT 8 PM

1048 — "NEVER MIND, LET'S DO BOULDER."

106 — THESE MOVIES ARE PLAYING IN BOULDER TONIGHT:
  MOVIE 1 AT 7 PM, 9 PM
  MOVIE 2 AT 7:30 PM, 10 PM
  MOVIE 3 AT 8 PM

FIG. 10

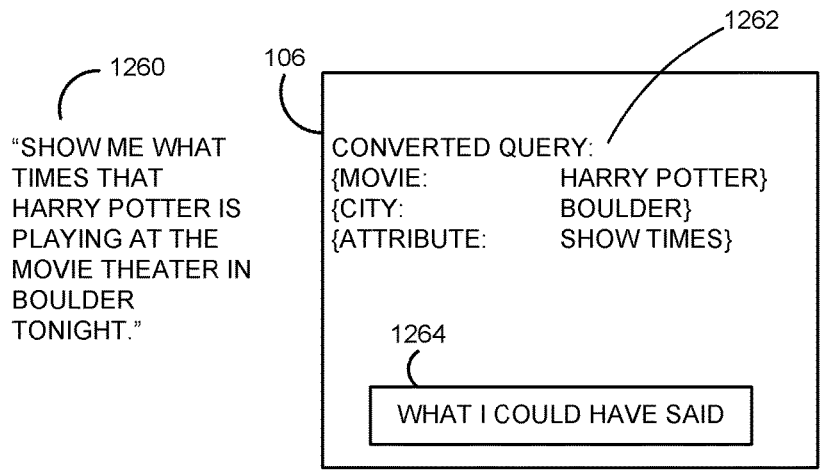
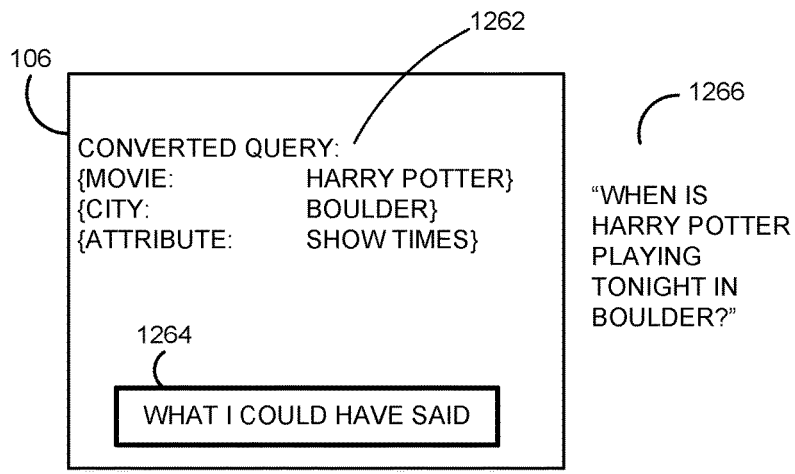
FIG. 12

SYSTEMS AND METHODS FOR EDITING AND REPLAYING NATURAL LANGUAGE QUERIES

FIELD OF THE INVENTION

In general, this disclosure relates to processing and editing natural language queries.

BACKGROUND

Computing systems that are capable of interacting with a user using natural language typically interpret the user's statement and immediately take some action, such as performing a search or generating an item. However, if the machine interpretation of the user's statement is off by just a single word or a slight nuance, the interpretation of the statement can be completely wrong, useless, and even detrimental. To remedy this, existing systems require the user to repeat the entire statement, possibly varying a few words, in order to achieve the desired result.

SUMMARY

Systems and methods are disclosed herein for processing a natural language query. A receiver circuitry receives the natural language query from a user. A natural language interpreter circuitry parses the natural language query to convert the natural language query into a plurality of categories and a plurality of variables, each variable in the plurality of variables corresponding to one category in the plurality of categories. A user interface displays to the user the plurality of categories and the plurality of variables, and allows the user to modify at least one variable in the plurality of variables by providing a natural language utterance.

Another aspect relates to a system including means for processing a natural language query. A receiving means receives the natural language query from a user. A natural language interpreting means parses the natural language query to convert the natural language query into a plurality of categories and a plurality of variables, each variable in the plurality of variables corresponding to one category in the plurality of categories. An interfacing means displays to the user the plurality of categories and the plurality of variables, and allows the user to modify at least one variable in the plurality of variables by providing a natural language utterance.

In some embodiments, the natural language query is a request to display a list of files on a web-based storage system. The plurality of categories may include at least two of: a file type, a file owner, a time, and a location. The system may further include means for filtering a plurality of user files on the web-based storage system based on the plurality of categories and the plurality of variables.

In some embodiments, the user modifies the at least one variable by selecting the at least one variable and speaking a phrase to replace the at least one variable. The system may further comprise means for allowing the user to modify the natural language query by speaking a phrase to add one or more additional categories and variables to the natural language query. The system may further comprise means for determining whether to update the natural language query or generate a new query based on a number of categories and variables in the natural language utterance provided by the user.

The means for allowing the user to modify the at least one variable may obtain a modification to the natural language query, and the means for allowing the user to modify the at least one variable may further allow the user to undo the modification to return to the natural language query.

In some embodiments, the system further includes means for filtering a list of items to obtain a filtered list of items, based on the plurality of categories and the plurality of variables, means for providing the filtered list of items to the user, and means for flagging one or more of the items in the filtered list of items in response to receiving a user request to flag the one or more of the items. In response to receiving a user input indicative of a request for a machine-generated natural language query that would result in the plurality of categories and the plurality of variables, the interfacing means may further provide the machine-generated natural language query to the user.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 8 is a diagram of a display of a user interface that provides a list of results corresponding to documents that were accessed by a user at a specified time and location, according to an illustrative embodiment.

FIG. 9 is a diagram of a display of a user interface that provides a list of results corresponding to documents that were accessed by a user at a specified time and location, and that indicates that the results are saved in a newly created folder, according to an illustrative embodiment.

FIG. 10 shows three diagrams of a display of a user interface that allows a user to modify an existing query and undo the modification, according to an illustrative embodiment.

FIG. 12 shows two diagrams of a display of a user interface that provides a user with a machine-generated natural language utterance that would result in the same characteristics as an utterance provided by the user, according to an illustrative embodiment.

DETAILED DESCRIPTION

To provide an overall understanding of the disclosure, certain illustrative embodiments will now be described, including a system for editing natural language queries. In particular, a device is described that allows for efficient processing and editing of queries in a natural language format. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for providing editing and processing of queries in a natural language format. The device described herein is easy to use and allows for a user to efficiently and easily provide instructions to a device for displaying and organizing documents. The systems and methods described herein overcome many of the technical difficulties associated with existing natural language interpreters and are described in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
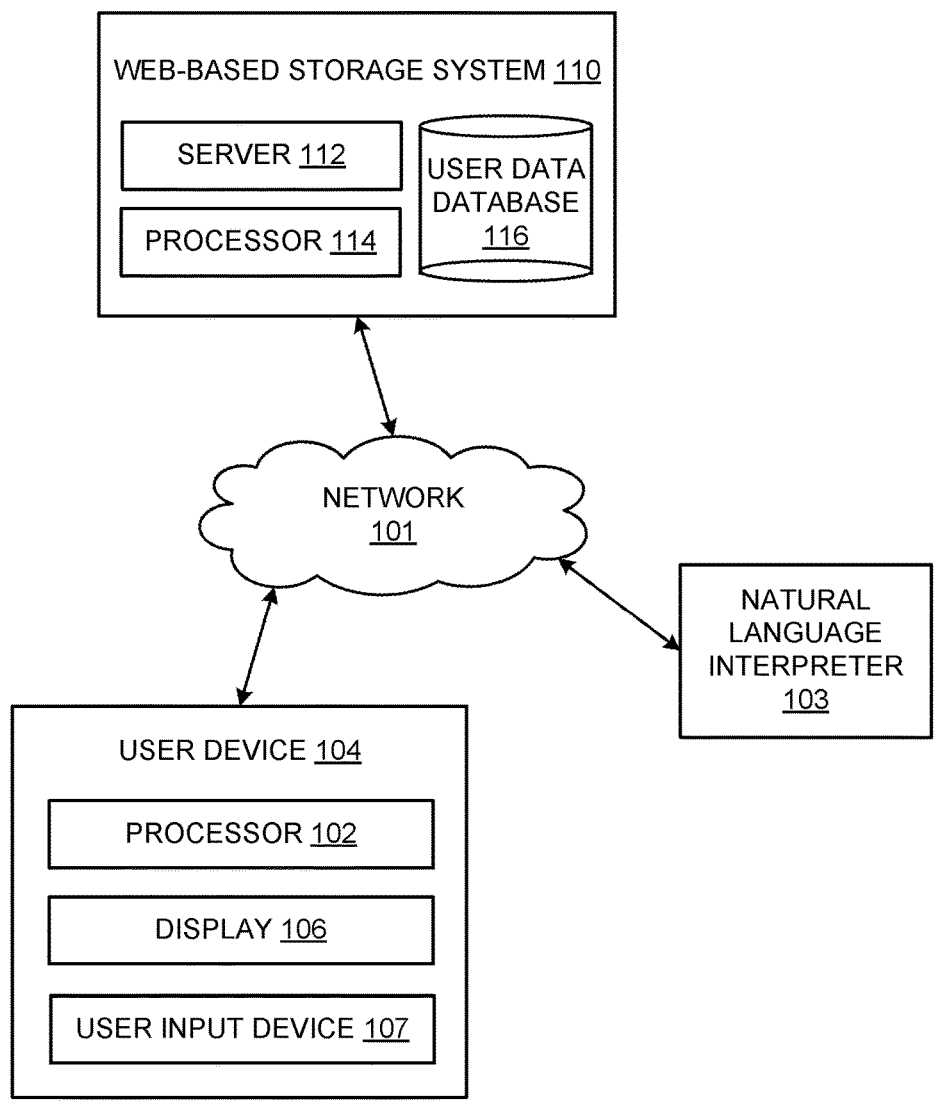
FIG. 1 is a block diagram of a computerized system for processing a natural language query, according to an illustrative embodiment.

FIG. 1 depicts an example of a network and database structure that may be used to implement the systems and methods herein. FIG. 1 is a block diagram of a computerized system 100 for allowing a user to interact with a user device 104 using natural language queries. The system 100 includes a web-based storage system 110, a user device 104, and a natural language interpreter 103, all configured to communicate over a network 101. The web-based storage system 110 includes a server 112, a processor 114, and a user data database 116. The user device 104 includes a processor 102, a display 106, and a user input device 107. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one web-based storage system 110, one user device 104, and one natural language interpreter 103 are shown in FIG. 1 to avoid complicating the drawing. In general, the system 100 can support multiple web-based storage systems, user devices, and natural language interpreters.

The web-based storage system 110 is a file hosting system that allows users to store, retrieve, and modify data. This data may be referred to as a user's web data, which is stored in the user data database 116. The server 112, the processor 114, or both may perform functions related to maintaining the user data database 116, such as allocating memory for the data, receiving new data to be stored in the database, deleting data in the database, or any other suitable function related to database maintenance. The web-based storage system 110 may be stored on a single server system or in a distributed system. In particular, the web-based storage system 110 may use cloud storage to store user data. In some embodiments, the web-based storage system 110 does not include the user data database 116 and simply includes the server 112 and the processor 114, which may be implemented on the same device or different devices. For example, the web-based storage system 110 may be a system that provides web results to search queries or map queries without storing user files in a database.

Figure 2:
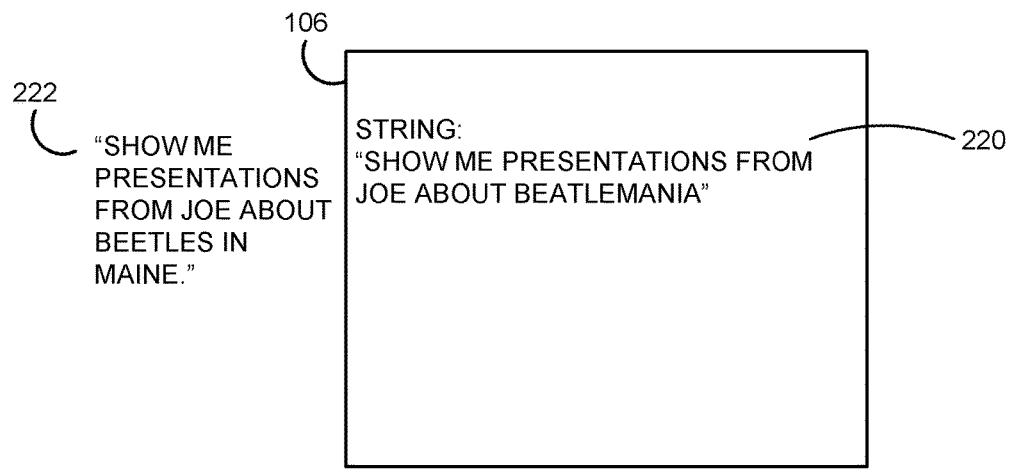
FIG. 2 is a diagram of a display of a user interface for allowing a user to provide a natural language utterance to a user device, according to an illustrative embodiment.
Figure 3:
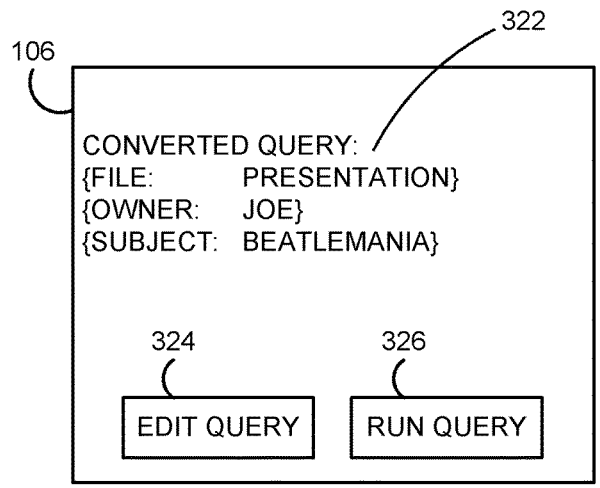
FIG. 3 is a diagram of a display of a user interface that displays a converted query generated based on a natural language utterance and allows a user to modify or run the query, according to an illustrative embodiment.

The user device 104 is configured to interact with a user over the display 106 and the user input device 107 to enable the user to provide natural language queries or commands. The natural language input is processed by the natural language interpreter 103, which converts the natural language queries or commands into a set of machine-executable instructions. In particular, the natural language interpreter 103 receives the natural language user input over the user input device 107, and converts the input into a converted query, which includes a selected subset of list of categories, and a variable or value for each category in the selected subset. One example of a natural language query is shown in FIG. 2, and an example of the converted version of the same query is shown in FIG. 3.

The user input device 107 may include a microphone, such that the user may speak into the user device 104, and the natural language interpreter 103 may include circuitry that is configured to translate the audio signal recorded by the microphone into a transcription of words. In another example, the user input device 107 may include a keyboard, a mouse, or a touch screen, such that the user may provide the user input by typing the query or selecting certain options on the display 106. After obtaining a transcription of what the user said into the microphone, or obtaining the user input via the keyboard, mouse, or touch screen, the natural language interpreter processes the natural language query to convert the query into a series of categories and variables. The converted query may be displayed over the display 106, and the user may be allowed to edit, correct, or otherwise change the converted query so that the resulting query resembles what the user wishes the system to do.

The natural language interpreter 103 may include a processor and a memory unit that stores instructions readable by the processor to carry out any of the processes described herein. As shown in FIG. 1, the natural language interpreter 103 is a separate device from the web-based storage system 110 and the user device 104. However, any of the functions described herein as being implemented by the natural language interpreter 103 may be performed by the processor 114 on the web-based storage system 110, by the processor 102 on the user device 104, or both the processors 114 and 102.

Moreover, the user device 104 may include a memory unit that stores instructions readable by the processor 102 to carry out the processes described herein. In an example, the user may provide a query into the user device 104 to determine a location of a contact's device, such as a friend's phone. The name of the contact may be synchronized from a server, Of may be local to the user device 104. In the latter case, the user may provide a natural language query that includes the contact's name, and the user device 104 may process the query to identify the contact's name. In some embodiments, the user device 104 may collaborate with the natural language interpreter 103 to process a natural language query. In particular, the user device 104 may identify the contact's name by parsing a locally stored list of names, while the natural language interpreter 103 parses the remaining portion of the query. In some embodiments, the user device 104 may be temporarily disconnected from the network 101, but content may be cached locally on the user device 104. In this case, natural language queries that are received by the user device 104 may still be serviced with the cached local content, even when the user device 104 is offline.

Figure 11:
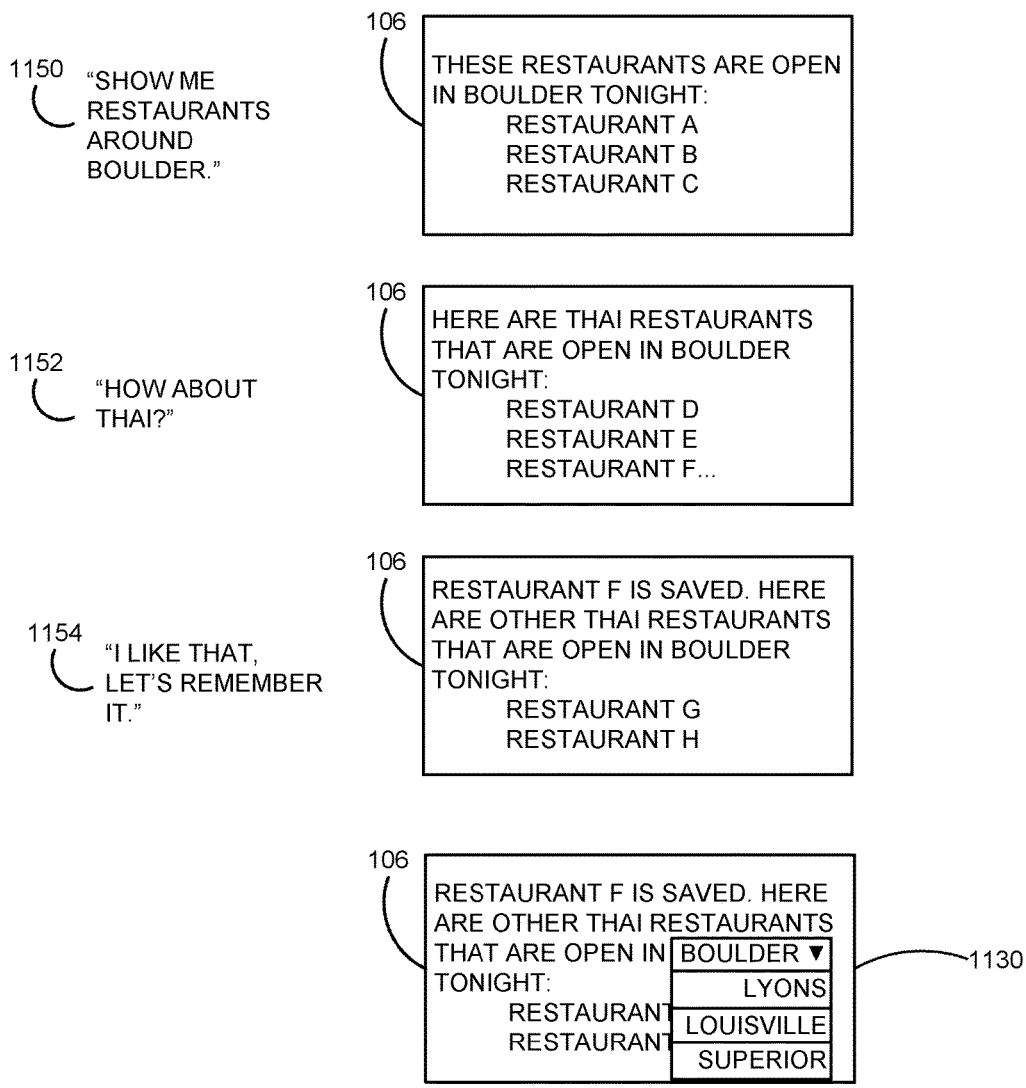
FIG. 11 shows three diagrams of a display of a user interface that allows a user to add a category and variable to an existing query and flag a resulting item, according to an illustrative embodiment.

FIGS. 2-12 are exemplary diagrams of a display 106 of the user device 104. In particular, FIGS. 2-7 depict diagrams of the display 106 that allow a user to edit and modify a query. FIG. 8 is a diagram of the display 106 when the user wishes to display certain documents that satisfy some criteria. FIG. 9 is a diagram of the display 106 when the user wishes to create a new folder on the web-based storage system 110 and save particular files in the new folder. FIG. 10 shows three diagrams of the display 106 when the user changes his mind regarding one of the variables in the natural language query, and ultimately returns to his original choice. FIG. 11 shows three diagrams of the display 106 when the user indicates a desire to remember certain search results, so that those results may be returned to later. FIG. 12 is a diagram of the display 106 when the user device 104 provides a simplified version of a more verbose statement that the user said.

FIGS. 2-7 depict diagrams of the display 106 that allow a user to edit and modify a query. FIG. 2 depicts the user speaking the utterance 222 "show me presentations from Joe about beetles in Maine" into a microphone on the user device 104, which obtains a transcription of the utterance 222 using local transcription circuitry on the user device 104, transcription circuitry on the natural language interpreter 103, or any other transcription service that is capable of translating a spoken utterance into written text. After a transcription of the utterance 222 is obtained, the transcription 220 is shown on the display 106 of the user device 104. In some embodiments, portions of the utterance 222 are transcribed as the user speaks the utterance 222, such that the transcription 220 is displayed and updated as the utterance 222 is being spoken. Alternatively, the transcription 220 may only be displayed after the utterance 222 is completed. The user may provide some user input to the user device 104, such as pushing a button on the user device 104 to indicate a beginning or end of an utterance, or to hold down a button while speaking, such that the start and end of the utterance 222 may be detected by the user device 104. In an example, the user device 104 may provide an audio, visual, or tactile indicator to the user that indicates when the end of an utterance is detected. As is shown in FIG. 2, the transcription 220 does not match the utterance 222. The user device 104 allows for the user to make modifications to the transcription 220 to correspond to the user's original request, or a new request.

FIG. 3 depicts a converted query that is derived from the transcription 220. The transcription 220 may be transmitted to or obtained by the natural language interpreter 103, which processes the transcription 220 to obtain the converted query 322. In particular, the natural language interpreter 103 parses the transcription 220 to determine a set of categories and a set of corresponding variables based on the transcription 220. As shown in FIG. 3, the converted query 322 includes three categories (file, owner, and subject) and three variables (presentation, Joe, and Beatlemania). The display 106 further includes an edit query button 324 and a run query button 326. The edit query button 324 may be selected by the user if the converted query 322 does not correspond to the user's utterance, or if the user wishes to modify the converted query 322 in any way, such as adding, removing, or replacing one or more categories, and/or changing a variable of an existing category. If the user is satisfied with the converted query 322, the user selects the run query button 326 to cause the user device 104 to communicate with the web-based storage system 110 to perform the query. In some embodiments, the transcription 220 is not displayed to the user, and the converted query 322 is displayed in response to detection of the user's utterance 222.

Figure 4:
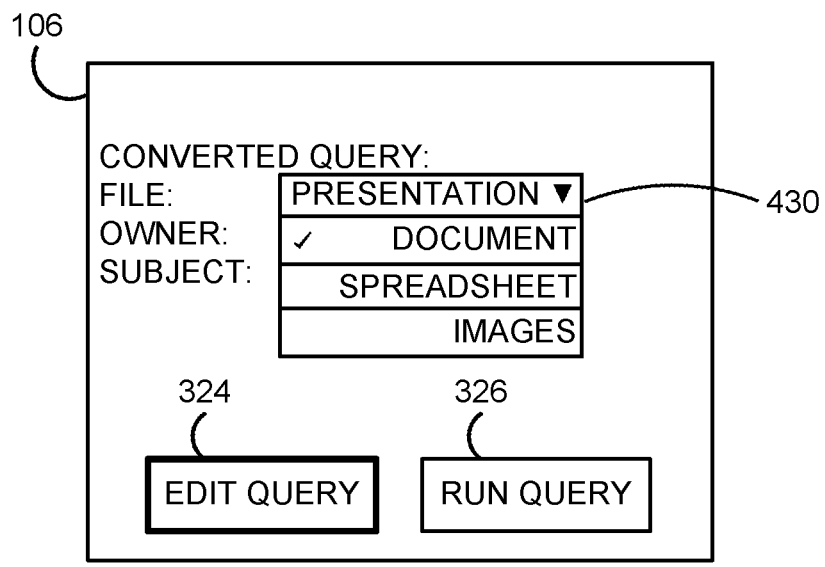
FIG. 4 is a diagram of a display of a user interface that allows a user to modify a variable in a query by selecting an item from a menu, according to an illustrative embodiment.
Figure 5:
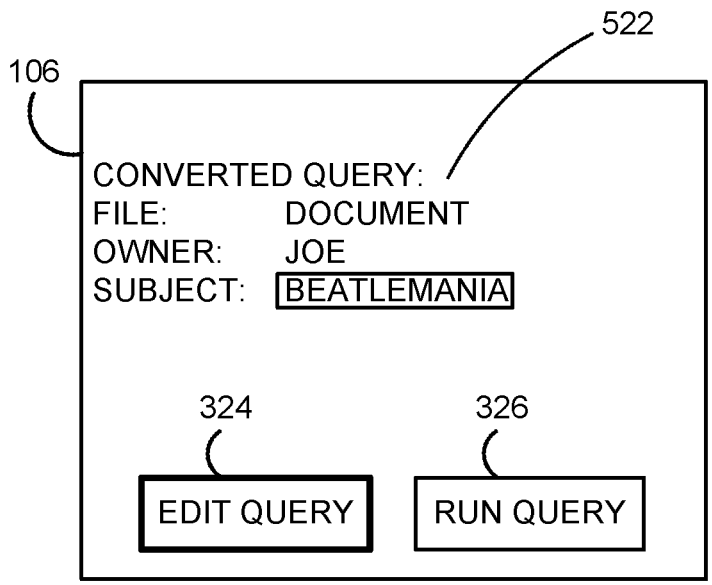
FIGS. 5 and 6 are diagrams of a display of a user interface that allows a user to modify a variable in a query by replacing the variable with a different uttered variable, according to an illustrative embodiment.
Figure 6:
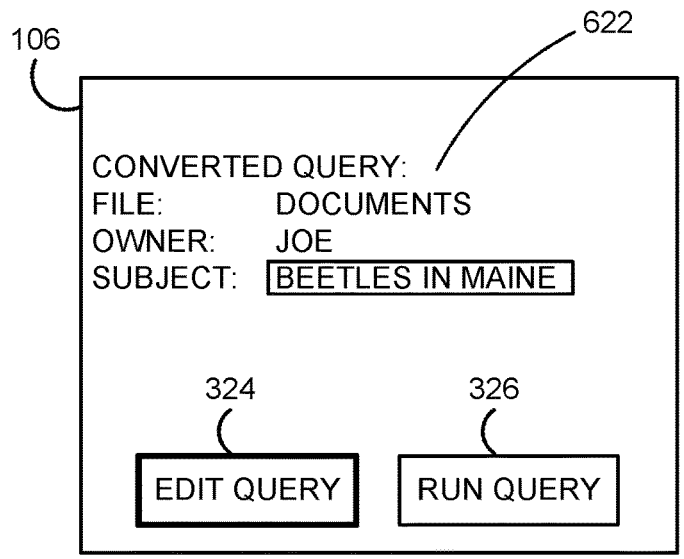

FIGS. 4-6 show exemplary diagrams of the display 106 when the user indicates a desire to edit the converted query. In particular, in FIG. 4, the edit query button 324 is pressed, and the user selects the variable 430 "presentation" to modify. Even though the portion of the transcription 220 corresponding to the "file" category matched the corresponding portion of the spoken utterance 222, the user may nonetheless wish to modify the variable 430 in the converted query. For example, even though the user said "show me presentations," the user may change his mind after speaking the utterance 222 and may wish to update the query to involve documents, instead of presentations. When the variable 430 is selected, a drop-down menu is displayed, and the user may select a different variable for the "file" category in the converted query. As is shown in FIG. 4, the user may select the variable "document" to use as the variable 430, to replace "presentation." FIG. 4 shows only the "file" category being updated using a drop-down menu. However, any of the categories shown on the display 106 may be updated in this manner, especially when there is a small number of possible variables for a particular category, or when the system may be capable of predicting what the user meant to say. While a drop-down menu is shown in FIG. 4, one of ordinary skill will appreciate that the user may provide an indication to modify a portion of a query, and may speak the replacement variable instead of selecting it from a drop-down menu.

FIGS. 5 and 6 show the display 106 after the updated converted query 522 has been modified based on the change shown and described in relation to FIG. 4. In the updated converted query 522 of FIG. 5, the "file" category has been modified to "document." Moreover, the edit query button 324 is still selected, such that the user may continue to modify the updated converted query 522. In particular, as is shown in FIG. 5, the user selects the variable "Beatlemania" under the "subject" category. In this case, the variable in the converted query results from a transcription error that arose when the user uttered "beetles in Maine," but the transcription circuitry recognized this utterance as "Beatlemania." The user may correct the error by selecting the "Beatlemania" variable in the converted query 522, and a drop-down menu of possible replacements may be displayed, such as is shown in FIG. 4. The possible replacements in the drop-down menu may include words or phrases that are similar to "Beatlemania," in meaning and/or in sound.

In some embodiments, the user may speak the word or phrase to replace the variable name. In this case, the user may press a button on the user device 104 to indicate that the user device 104 should record the user's utterance and use the utterance to replace the selected variable. For example, the user may wish to replace "Beatlemania" with the subject in the original utterance "beetles in Maine." In this case, the user may speak or type the phrase "beetles in Maine" while the user device 104 records the phrase, and replaces the "subject" variable with "beetles in Maine," as is shown in the converted query 622 in FIG. 6. When the user is satisfied with the converted query, the user may select the run query button 326 for the system to perform the query.

Figure 7:
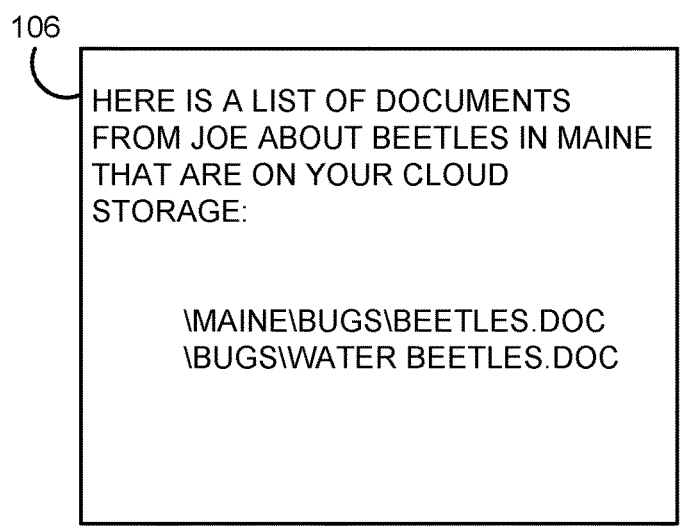
FIG. 7 is a diagram of a display of a user interface that provides a list of results to a query generated based on a user's natural language utterance, according to an illustrative embodiment.

FIG. 7 shows the display 106 after the query is performed. The display 106 includes a filtered list of files that result after filters corresponding to the converted query 622 are applied to files stored on the web-based storage system 110. In particular, the files that are stored on the web-based storage system 110 and are associated with the user who spoke the utterance 222 are filtered according to files that are documents, files that are owned by Joe (and likely shared with the user), and files that pertain to beetles in Maine. As shown in FIG. 7, two files on the web-based storage system 110 survive this filtering process and are shown on the display 106.

The diagrams shown in FIGS. 2-7 are shown for illustrative purposes only, and while the diagrams in FIGS. 8-12 do not show the process of a user being able to modify a query, the processes shown and described in relation to FIGS. 2-7 may be applied to any of the embodiments described herein.

FIG. 8 shows two diagrams of the display 106 when the user wishes to display certain documents that satisfy some criteria. The user speaks the utterance 840 "show me the documents that I opened at the restaurant last night." Alternatively, the user may type or otherwise provide the utterance 840 into the user device 104 via the user input device 107. As shown in FIG. 8, in response to receiving the utterance 840, the display 106 on the user device 104 shows a list of three documents that the user opened at Restaurant A between the hours of 7 and 9 μm the previous night. In order to process the utterance 840 to identify these three documents, the natural language interpreter 103 converts the utterance 840 into a query including categories and variables, such as those shown in relation to FIGS. 3-6. The categories may include "file type," "location," and "time," and the corresponding variables may include "document," "restaurant," and "last night," respectively. Then, the web-based storage system 110 may determine the user's locations between the hours of 5 μm and 12 am the previous night from a set of user-specific location data, and may correlate the user's locations with known restaurants as well as any files that were accessed when the location matches a restaurant. The files are then shown on the display 106, as shown in the top diagram of FIG. 8.

When the files are shown to the user, the user may realize that he actually wanted the files that were opened at another location that he went to after Restaurant A the previous night. He may not recall the name of the other location, so the user speaks the utterance 841 "no the place after Restaurant A." Alternatively, the user may type or otherwise provide the utterance 841 into the user device 104 via the user input device 107. The natural language interpreter 103 may determine that this utterance is a request to modify the "location" category variable of the previous query. The web-based storage system 110 may then determine the user's location after the user left Restaurant A. In the example shown in FIG. 8, the other location is Bar B. The web-based storage system 110 may then correlate the times that the user was at Bar B with any user files that were accessed or opened by the user at those times. The two documents that the user had accessed while at Bar B are then displayed on the display 106, as shown in the bottom diagram of FIG. 8. In another example, the user may request to see files that were accessed when the user was visiting a friend's home. In this case, the user may speak the utterance "what about the documents I opened at Sally's last night." The user device 104 may include an address book for a list of the user's contacts, and may use the address book to determine the times that the user was at Sally's home the previous night.

In some embodiments, the user device 104 may be a mobile device such as a smartphone or a tablet that has location detection capabilities, such as GPS. The user device 104 may then be able to use location determination circuitry that is local to the user device 104 to track the user's location from the previous evening. In doing so, the user device 104 may determine which documents in the user's cloud storage on the web-based storage system 110 were accessed when the user was at a restaurant or any other known location.

In some embodiments, the user device 104 is a different device from the device used to access the user's documents when the user was at the restaurant. In one example, the user device 104 may be a tablet, while the device that was used to access the user's documents at the restaurant may be a mobile phone. The mobile phone may have GPS capabilities, such that the mobile phone may be capable of detecting the user's location, and may be configured by the user to transmit the user's location data to be stored on the web-based storage system 110 in association with the user or a user's file. In another example, the user may use the mobile phone to log the user's location and share the user's location on a social media application. In particular, the user may provide a user input into an online service on the mobile phone that alerts or provides notifications to the user's contacts regarding the user's location, such as the name of the restaurant or shop that the user visits. When the user later accesses the web-based storage system 110 using a different device, such as a tablet or the user device 104, the web-based storage system 110 is able to determine the user's location data and correlate the user's location data with what files were accessed when the user was at a particular location. The example described herein is related to a mobile phone and a tablet, but is generally applicable to any type of user devices that are capable of communicating with the web-based storage system 110 over the network 101. In some embodiments, whether the user's location is detected and/or transmitted to the web-based storage system 110 is set by a user configurable option, such that the user may enable or disable location detection.

FIG. 9 shows diagrams of the display 106 when the user wishes to create a new folder on the web-based storage system 110 and save particular files in the new folder. The user speaks the utterance 942 "make a folder and put all the documents in the Chicago trip last week in the folder. Call it last week's trip." Alternatively, the user may type or otherwise provide the utterance 942 into the user device 104 via the user input device 107. As shown in FIG. 9, in response to receiving the utterance 942, the display 106 on the user device 104 shows a list of three documents (A, B, and C) that are stored in a folder named "last week's trip." As was described in relation to FIG. 8, the user device 104 or other user device may record the location of the user, such that the web-based storage system 110 stores data indicative of the user's location, and may use the location data to identify the documents referred to by the utterance 942. Moreover, the natural language interpreter 103 may convert the utterance 942 into a query including categories and variables, such as those shown in relation to FIGS. 3-6. The categories may include "file type," "location," and "time," and the corresponding variables may include "document," "Chicago," and "last week," respectively. Then, the web-based storage system 110 may determine when the user was in Chicago last week, and any files that were created or accessed during the Chicago trip. The files are saved in a new folder named "last week's trip," as is shown in the top diagram of FIG. 9. The user may then change his mind and speak the utterance 943 "actually, let's call it Chicago instead." The natural language interpreter 103 may determine that the utterance 943 corresponds to a modification of the previous request, and updates the name of the newly created folder from "last week's trip" to "Chicago," as is shown in the bottom diagram of FIG. 9.

FIG. 10 shows three diagrams of the display 106 when the user changes his mind regarding one of the variables in the natural language query, but ultimately returns to his original choice. As shown in FIG. 10, the user speaks three utterances 1044, 1046, and 1048, and the display 106 is different in response to each utterance. The first utterance 1044 is "show me movies playing tonight in Boulder." In response to detecting the first utterance 1044, the natural language interpreter 103 forms a query, which may include categories such as "what," "where," and "when," and variables "movies at theaters," "Boulder," and "tonight." The query may be provided to an online service that responds to such queries with movie names and show times, such as those shown in the top display 106 of FIG. 10.

The user, after seeing the top display 106, may then change his mind and wish to see movies playing in Lyons, instead of Boulder. In this case, the user may utter the second utterance 1046 "actually, let's try Lyons." In response to detecting the second utterance, the natural language interpreter 103 determines that the second utterance 1046 should be treated as a desired modification to the first utterance 1044. Instead of forming a new query with only one category ("where") and one variable ("Lyons"), the natural language interpreter 103 recognizes that Lyons is another location that is near Boulder, and replaces the variable "Boulder" with the variable "Lyons" in the original query, while keeping the rest of the original query the same. In response to the second utterance 1046, the middle display 106 of FIG. 10 shows the showtimes of movies playing in Lyons.

The natural language interpreter 103 may be able to distinguish between utterances that result in new queries and utterances that simply modify existing queries based on contextual indicators, such as "actually, let's try . . . " or "instead of X, check Y." Moreover, the utterances that should result in new queries may be distinguished from utterances that modify existing queries by determining a number of categories associated with each utterance. In particular, the second utterance 1046 only includes one category ("where"). Since this category was also a category formed in response to the first utterance 1044, the natural language interpreter 103 may use this as a cue to modify the original query, rather than generate a new query with only a single category. Importantly, rather than requiring the user to re-say the entire original utterance, the present disclosure is capable of recognizing when the user wishes to simply modify an existing query and uses natural language processing to efficiently handle requests from the user.

The user, after seeing the middle display 106, may again change his mind and revert back to Boulder from Lyons. In this case, the user may utter the third utterance 1048 "never mind, let's do Boulder." In response to detecting the third utterance, the natural language interpreter 103 determines that the third utterance 1048 should be treated as a modification to the most recent query. Upon detecting the phrase "never mind," the natural language interpreter 103 may use such detection as a cue to undo any recent changes that were made to existing queries. Moreover, the natural language interpreter 103 or another circuitry that communicates with the natural language interpreter 103 may recognize that Boulder and Lyons are both names of locations, and are suitable variables for the "where" category. After determining that both Boulder and Lyons have this property, or receiving an indication that Boulder and Lyons share this property, the natural language interpreter 103 may replace the "where" category variable "Lyons" with "Boulder," and determine that the same query was previously run in response to the first utterance. Rather than re-running the same query, the user device 104 may return to the original top display 106 of FIG. 10, such that the bottom display 106 of FIG. 10 is identical to the top display 106 of FIG. 10.

FIG. 11 shows four diagrams of the display 106 when the user indicates a desire to remember certain search results, so that those results may be returned to later. As shown in FIG. 11, the user speaks three utterances 1150, 1152, and 1154, and the display 106 is different in response to each utterance. The first utterance 1150 is "show me restaurants around Boulder." In response to detecting the first utterance 1150, the natural language interpreter 103 forms a query, which may include categories such as "what" and "where," and variables "restaurants" and "Boulder." Moreover, even though the user has not stated "restaurants that are open tonight," the natural language interpreter 103 may assume, based on the time of day that the first utterance 1150 is spoken, that only restaurants that are open tonight should be displayed. In this case, the base query that is formed strictly from the first utterance 1150 is modified to include an additional category "when" and variable "open tonight." The query may be provided to an online service that responds to such queries with names of restaurants, such as those shown in the top display 106 of FIG. 10. The top display 106 also includes an indication that the system has made an assumption that the user meant to search for restaurants that are open tonight. If necessary, the user may correct such assumptions by providing utterances such as "no not tonight, tomorrow night" or "search for tomorrow lunchtime instead."

The user, after seeing the top display 106 in FIG. 11, may then wish to apply additional filtering to the search results. In particular, the user may speak the second utterance 1152 "how about Thai?" In response to detecting the second utterance 1152, the natural language interpreter 103 determines that the second utterance 1152 should be treated as a desired modification to the first utterance 1150. Instead of forming a new query with only one category ("what") and one variable ("Thai"), the natural language interpreter 103 recognizes that Thai is a type of cuisine that is relevant to the previous query, and adds a new category "cuisine" with variable "Thai" to the previous query. The rest of the original query is kept the same. In response to the second utterance 1152, the seconddisplay 106 of FIG. 11 shows a list of Thai restaurants.

The user, after seeing the seconddisplay 106, may wish to remember restaurant F at a later point. In particular, restaurants D, E, and F may be shown sequentially on the seconddisplay 106. While the names of the restaurants are shown, a brief description of the restaurants may also be provided over the display 106. Moreover, the user device 104 may further include a speaker that provides audio signals indicating the names of the restaurants and/or a brief description of each restaurant. In response to seeing or hearing restaurant F, the user may speak the third utterance 1154 "I like that, let's remember it." In response to detecting the third utterance 1154, system may flag restaurant F as an item to store into a special list of items that the user may return to later. The thirddisplay 106 of FIG. 11 provides an indication that restaurant F is saved. Later, after viewing or hearing additional restaurants, the user may wish to return to the saved restaurants in the special list. In some embodiments, the display 106 includes a drop-down menu for one or more variables. In the bottom display of FIG. 11, the display 106 includes a drop-down menu 1130, which may be displayed if the user selects the variable "Boulder" and shows various options for replacing the variable "Boulder." Specifically, the system may recognize that Lyons, Louisville, and Superior are towns located near Boulder that may also have Thai restaurants. The system may filter the replacement options based on whether they have Thai restaurants. In addition or alternatively, the system may sort the replacement options based on a number of Thai restaurants in each town, such that towns with more Thai restaurants (or better ranked restaurants) are displayed before other towns.

FIG. 12 is a diagram of the display 106 when the user device 104 provides a simplified version of a more verbose statement that the user said. As shown in FIG. 12, the user speaks an utterance 1260 "show me what times Harry Potter is playing at the movie theater in Boulder tonight." In response to detecting the utterance 1260, the natural language interpreter 103 forms a query 1262, which as shown in the top display 106 of FIG. 12 includes three categories "movie," "city," and "attribute" and three corresponding variables "Harry Potter," "Boulder," and "show times." When the user selects the button 1264, as is shown in the bottom display 106 of FIG. 12, the user device 106 provides an example machine-generated utterance 1266 "when is Harry Potter playing tonight in Boulder?" The user may select the button 1264 to determine what simpler utterance would have resulted in the same query to be formed as the query formed in response to the utterance 1260. By providing the example utterance 1266, the user device 104 provides a way for the user to understand a more concise and simpler statement that would have led to the same results.

Figure 13:
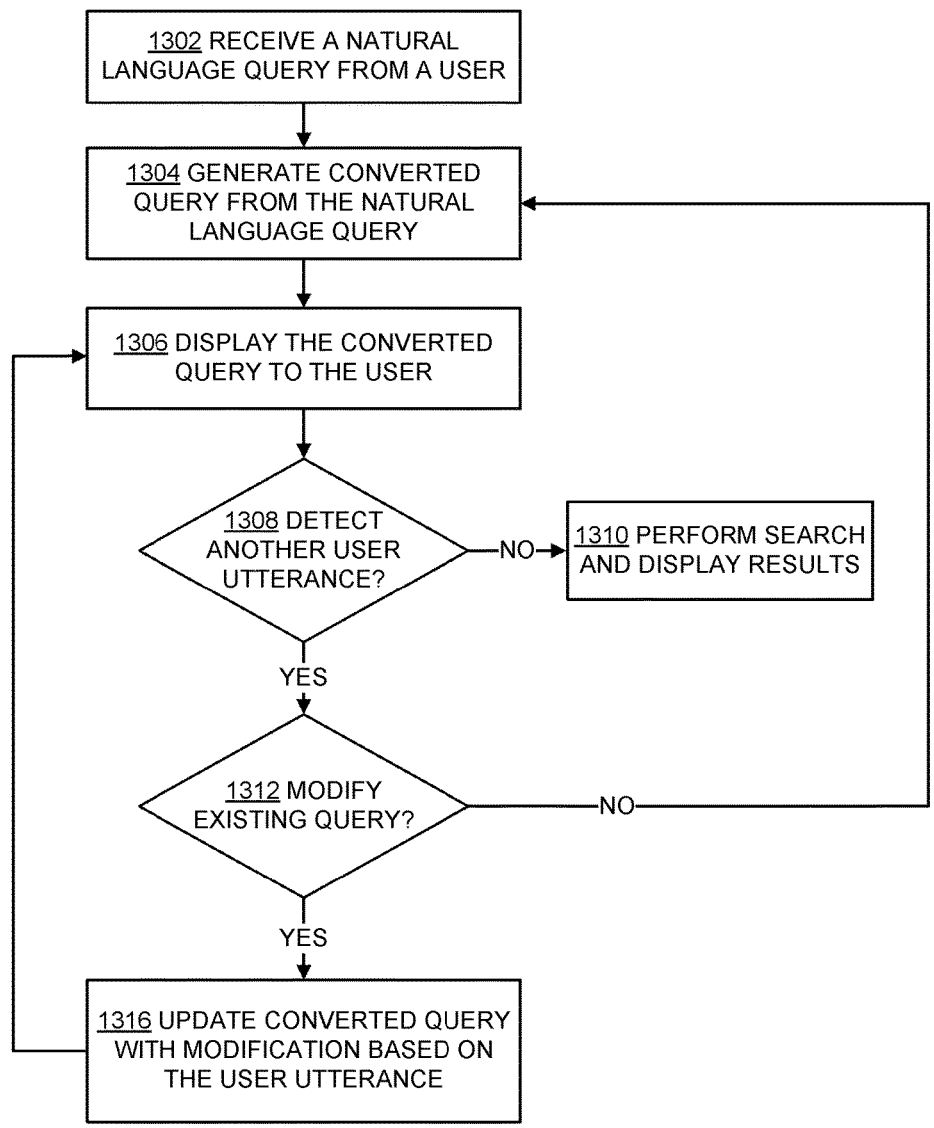
FIG. 13 is a detailed flow chart of an illustrative method for processing natural language queries, according to an illustrative embodiment.

FIG. 13 is a detailed flow chart of an illustrative method 1300 for processing natural language queries. The method 1300 includes the steps of receiving a natural language query from a user (step 1302), generating a converted query from the natural language query (step 1304), and displaying the converted query to the user (step 1306). If another user utterance is detected (decision block 1308), and if it is determined to modify the existing query (decision block 1312), then the converted query is updated with a modification based on the user utterance (step 1316). Otherwise, a new converted query is generated based on the user utterance (step 1314). These steps are repeated until no further user utterances are detected (decision block 1308), and the search is performed and the results are displayed (step 1310).

At step 1302, the user device 104 receives a natural language query from a user. The user device 104 may receive the natural language query from the user over the user input device 107. In an example, the user input device 107 includes a microphone that allows the user to speak into the user device to provide the natural language query. The audio signal that is recorded may then be transcribed using a transcription service that may be local or remote to the user device 104, the natural language interpreter 103, or the web-based storage system 110. Alternatively or in addition, the user input device 107 may include a keyboard or a touch screen for the user to type the query into the user device 104.

At step 1304, the natural language interpreter 103 generates a converted query from the natural language query.

After the natural language query is transcribed or otherwise received, the natural language interpreter 103 processes the natural language query to obtain a converted query. In particular, as is described in relation to FIG. 3, the natural language interpreter 103 parses the transcription to determine a set of categories and a set of corresponding variables based on the transcription. In the example shown in FIG. 3, the converted query 322 includes three categories (file, owner, and subject) and three variables (presentation, Joe, and Beatlemania). At step 1306, the user device 104 displays the converted query to the user over the display 106, such as the example display 106 shown in FIG. 3.

At decision block 1308, the user device 104 determines whether another user utterance is detected. The user device 104 may detect another user utterance by determining whether the user has spoken or otherwise provided another utterance to the user input device 107. In an example, the user may press a button on the user device 104 that indicates a desire to begin and/or end recording an acoustic signal over a microphone on the user input device 107.

If another user utterance is detected, the method 1300 proceeds to decision block 1312 to determine whether to modify the existing query that was generated at step 1304, or whether to create a new query. For example, if the user utterance detected at decision block 1308 corresponds to a single category and variable, the natural language interpreter 103 may determine that it is appropriate to modify the existing query, rather than create a new query. Moreover, the natural language interpreter 103 may be configured to detect any cues in the user's utterance. For example, one cue may be that the user provides a user input indicative of a desire to edit the query, such as the edit query button 324 shown in FIGS. 2-6. In another example, the natural language interpreter 103 may detect certain terms or phrases that occur in the user's utterance, such as "actually, let's try . . . " or "never mind, let's do . . . " as is shown and described in relation to FIG. 1. The natural language interpreter 103 may use any one or any combination of these cues to determine whether to modify an existing query or to generate a new query.

If the natural language interpreter 103 determines to update the existing converted query, the method 1300 proceeds to step 1316 to update the converted query with a modification that is based on the user utterance. In particular, the modification may include replacing a variable for a category in the existing query, such as is shown and described in relation to FIG. 10. In another example, the modification may include adding a new category and a new corresponding variable to the existing query, such as is shown and described in relation to FIG. 11. After the query is updated at step 1316, the method 1300 returns to step 1306 to display the updated query to the user.

Otherwise, if the natural language interpreter 103 determines to generate a new query, the method 1300 returns to step 1304 to generate a new converted query based on the user utterance. These steps 1306, 1308, 1312, and 1316 are repeated until additional user utterances are no longer detected at decision block 1308. In that case, the method 1300 proceeds to step 1310 to perform the search based on the current query and display the results to the user.

Figure 14:
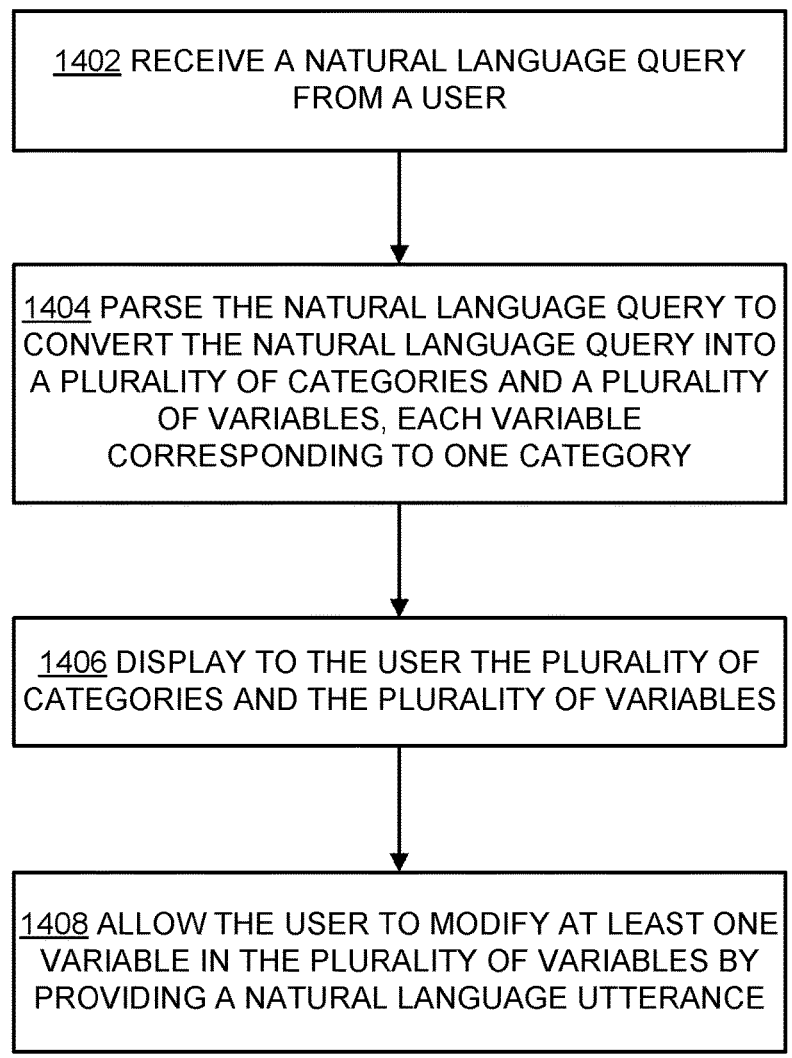
FIG. 14 is a high level flow chart of an illustrative method for processing natural language queries, according to an illustrative embodiment.

FIG. 14 is a high level flow chart of an illustrative method 1400 for processing natural language queries, according to an illustrative embodiment. The method 1400 includes the steps of receiving a natural language query from a user (step 1402), parsing the natural language query to convert the natural language query into a plurality of categories and a plurality of variables, each variable corresponding to one category (step 1404), displaying to the user the plurality of categories and the plurality of variables (step 1406), and allowing the user to modify at least one variable in the plurality of variables by providing a natural language utterance (step 1408).

At step 1402, the user device 104 receives a natural language query from a user. The user input device 107 may include a microphone that allows the user to speak into the user device to provide an audio signal that is then transcribed to obtain a transcription. Alternatively or in addition, the user input device 107 may include a keyboard or a touch screen for the user to type the query into the user device 104. In one example, the natural language query is a request to display a list of files on the web-based storage system 110, such as a filtered list according to file type, owner, time of access, and location of last access. Examples of such requests are shown and described in relation to FIGS. 2-9. In another example, the natural language query is a request to display a list of searchable attributes, such as movies (described in relation to FIGS. 10 and 12) or restaurants (described in relation to FIG. 11).

At step 1404, the natural language interpreter 103 parses the natural language query received at step 1402 to convert the natural language query into a converted query, where the converted query includes a plurality of categories and a plurality of variables, and where each variable corresponds to one category in the plurality of categories. As is described in relation to FIG. 3, the natural language interpreter 103 parses the transcription to determine a set of categories and a set of corresponding variables based on the transcription. In the example shown in FIG. 3, the converted query 322 includes three categories (file, owner, and subject) and three variables (presentation, Joe, and Beatlemania). The categories may include any number of: a file type, a file owner, a time of access of the file, and a location of the access of the file. The categories and variables may be used to filter the set of user files that are stored on the web-based storage system 110, such that only those files that satisfy all of the categories are displayed to the user. At step 1406, the user device 104 displays the converted query to the user over the display 106, such as the example display 106 shown in FIG. 3.

At step 1408, the user is allowed to modify at least one variable in the plurality of variables in the converted query by providing a natural language utterance. As is described in relation to FIG. 4, the user may modify a variable in the converted query by selecting the variable and selecting an item from a drop-down menu that appears in response to the selection. As is described in relation to FIGS. 5 and 6, the user may modify a variable in the converted query by selecting the variable and speaking a word or a phrase to replace the selected variable.

In some embodiments, the user is allowed to modify the natural language query by speaking a phrase to add one or more additional categories and variables to the natural language query, such as the example of adding the "cuisine" category and "Thai" variable that is shown and described in relation to FIG. 11. In response to allowing the user to modify the query, the natural language interpreter 103 may be configured to determine whether to update the natural language query or generate a new query. Such a determination may be made based on a number of categories and variables in the natural language utterance provided by the user. In some embodiments, the user is allowed to undo a modification that was previously made, such that the user may return to the results corresponding to an original or a previous natural language query.

In some embodiments, after the filtered list of items is provided to the user, one or more of the items may be flagged when a requested to flag any of the items is received from the user. In an example, the user may provide an utterance such as "let's remember that one." In response to detecting such an utterance, the current or most recent item on the displayed list may be marked or flagged as a favorite item for the user, such that the user may return to his favorites after considering more items.

In some embodiments, the user device 104 provides a machine-generated natural language query that results in the same converted query as the original natural language query provided by the user. As is shown and described in relation to FIG. 12, the machine-generated natural language query may be substantially more concise than the user's natural language query. In this manner, providing the machine-generated query to the user may teach the user how to more efficiently interact with the user device 104.

While the user requests are described herein as being related to files on a cloud storage system, movie showtimes, or restaurants, one of ordinary skill in the art will understand that the present disclosure may be applied to any other type of request to display a list of items, such as emails, messaging services, shopping services, or any other suitable item that may come up in a search.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method for processing a natural language query, the method comprising:

receiving, by a processor, a first natural language utterance from a user indicative of the natural language query;

parsing the natural language query to convert the natural language query into a converted query comprising a plurality of categories and a plurality of variables, each variable in the plurality of variables corresponding to a respective category of the plurality of categories;

providing the plurality of categories and the plurality of variables of the converted query for presentation;

responsive to receiving a user request to edit the converted query, automatically providing a plurality of replacement variables for a first category of the plurality of categories for presentation, wherein the first category is provided for the presentation based on the first natural language utterance from the user;

determining a second natural language utterance indicative of a selection of a first replacement variable from the presentation of the plurality of replacement variables for the first category of the plurality of categories;

responsive to determining the second natural language utterance indicative of the selection of the first replacement variable, modifying the converted query to generate a modified converted query comprising the first replacement variable for the first category;

providing a plurality of items for presentation based on the modified converted query;

receiving a user request to identify an example utterance that would have been converted into the modified converted query; and responsive to the user request to identify the example utterance, providing the example utterance for presentation to the user in an audio format via an audio device, wherein the example utterance is different than the first natural language utterance and the second natural language utterance.

2. The method of claim 1, wherein the natural language query is a request to display a list of files on a file storage system.

3. The method of claim 2, further comprising filtering a plurality of user files based on the modified converted query.

4. The method of claim 1, further comprising receiving a natural language utterance indicative of a selection of one or more replacement categories for the plurality of categories.

5. The method of claim 4, further comprising determining whether to modify the modified converted query or generate a new query based on a number of the one or more replacement categories.

6. The method of claim 1, further comprising:
receiving a natural language utterance indicative of a request to undo the modification to the converted query to generate the modified converted query; and
providing search results responsive to the converted query.

7. The method of claim 1, further comprising in response to receiving a user input indicative of a request for a machine-generated natural language query, providing a machine-generated natural language utterance based on the modified converted query.

8. A system for processing a natural language query, the system comprising:
a memory; and
a processor coupled to the memory, the processor to:
receive a first natural language utterance from a user indicative of the natural language query;
parse the natural language query to convert the natural language query into a converted query comprising a plurality of categories and a plurality of variables, each variable in the plurality of variables corresponding to a respective category of the plurality of categories;
provide the plurality of categories and the plurality of variables of the converted query for presentation;
responsive to receiving a user request to edit the converted query, automatically provide a plurality of replacement variable for a first category of the plurality of categories for presentation, wherein the first category is provided for presentation based on the first natural language utterance from the user;
determine a second natural language utterance indicative of a selection of a first replacement variable from the presentation of the plurality of replacement variables for the first category of the plurality of categories;
responsive to determining the second natural language utterance indicative of the selection of the first replacement variable, modify the converted query to generate a modified converted query comprising the first replacement variable for the first category;
provide a plurality of items for presentation based on the modified converted query;
receive a user request to identify an example utterance that would have been converted into the modified converted query; and
responsive to the user request to identify the example utterance, provide the example utterance for presentation to the user in an audio format via an audio device, wherein the example utterance is different than the first natural language utterance and the second natural language utterance.

9. The system of claim 8, wherein the natural language query is a request to display a list of files on a file storage system.

10. The system of claim 9, wherein the file storage system is a web-based storage system and the plurality of categories includes at least two of: a file type, a file owner, a time, or a location.

11. The system of claim 10, the processor further to filter a plurality of user files on the web-based storage system based on the modified converted query.

12. The system of claim 8, the processor further to receive a natural language utterance indicative of a selection of one or more replacement categories for the plurality of categories.

13. The system of claim 12, wherein the processor further to determine whether to modify the modified converted query or generate a new query based on a number of one or more replacement categories.

14. The system of claim 8, the processor further to:
receive a natural language utterance indicative of a request to undo the modification to the converted query to generate the modified converted query; and
provide search results responsive to the converted query.

15. The system of claim 8, wherein the processor is part of a server system.

16. The system of claim 8, wherein the example utterance comprises a machine-generated natural language query based on the modified converted query.

17. A non-transitory computer-readable medium comprising instructions that, responsive to execution by a processor, cause the processor to perform operations comprising:
receiving, by the processor, a first natural language utterance from a user indicative of a natural language query;
parsing the natural language query to convert the natural language query into a converted query comprising a plurality of categories and a plurality of variables, each variable in the plurality of variables corresponding to a respective category of the plurality of categories;
providing the plurality of categories and the plurality of variables of the converted query for presentation;
responsive to receiving a user request to edit the converted query, automatically providing a plurality of replacement variables for a first category of the plurality of categories for presentation, wherein the first category is provided for the presentation based on the first natural language utterance from the user;
determining a second natural language utterance indicative of a selection of a first replacement variable from the presentation of the plurality of replacement variables for the first category of the plurality of categories;
responsive to determining the second natural language utterance indicative of the selection of the first replacement variable, modifying the converted query to generate a modified converted query comprising the first replacement variable for the first category;
providing a plurality of items for presentation based on the modified converted query;
receiving a user request to identify an example utterance that would have been converted into the modified converted query; and
responsive to the user request to identify the example utterance, providing the example utterance for presentation to the user in an audio format via an audio device, wherein the example utterance is different than the first natural language utterance and the second natural language utterance.

\* \* \* \* \*